US005806712A

United States Patent [19]

Siemsen et al.

[11] Patent Number: 5,806,712

[45] Date of Patent: Sep. 15, 1998

[54] VENDING MACHINE FOR DISPENSING BEVERAGE CONTAINERS

[75] Inventors: Carl H. Siemsen; Robert A. Abt, both of St. Louis; Robert John Reese, St. Charles, all of Mo.

[73] Assignee: Crane Co., Stamford, Conn.

[21] Appl. No.: 739,549

[22] Filed: Oct. 30, 1996

[51] Int. Cl.[6] .................... B65G 59/00

[52] U.S. Cl. .................... 221/67; 211/59.2

[58] Field of Search .................... 221/124, 129, 221/133, 92, 67, 289, 194; 211/74, 49.1, 59.2

[56] References Cited

U.S. PATENT DOCUMENTS

| | | | |
|---|---|---|---|
| 3,026,002 | 3/1962 | Torres | 221/67 |
| 4,456,147 | 6/1984 | Tominaga | 221/67 |
| 4,730,750 | 3/1988 | Ficken | 221/124 |
| 4,823,984 | 4/1989 | Ficken | 221/96 |
| 4,997,106 | 3/1991 | Rockola | 211/59.2 |
| 5,236,103 | 8/1993 | Ficken et al. | 221/124 |

*Primary Examiner*—Kenneth Noland

*Attorney, Agent, or Firm*—Senniger, Powers, Leavitt & Roedel

[57] ABSTRACT

A vending machine for dispensing beverage containers having a cylindrical side wall forming a body and a neck extending from the cylindrical body. The body has a groove formed therein and extending around the circumference of the body. The vending machine includes at least one chute for storing and dispensing the containers. The chute has a loading end located at an upper end thereof for receiving the containers and a delivery end at a lower end thereof for delivering the containers to a delivery area of the vending machine. The chute has at least two sequential paths. A first path extends generally at a downwardly sloped angled position from the loading end of the chute. A second path extends generally downwardly at an angled position from the first path so that the containers roll along the chute towards the delivery end of the chute. The chute includes a guide member along at least a portion of one of the paths for engaging the groove formed in the body of the container to align the containers along at least a portion of the length of the path.

27 Claims, 7 Drawing Sheets

VENDING MACHINE FOR DISPENSING BEVERAGE CONTAINERS

BRIEF SUMMARY OF THE INVENTION

This invention relates generally to vending machines and more specifically to vending machines designed to deliver beverage containers such as bottled beverages.

Vending machines typically include serpentine shaped tracks for storing and delivering beverages contained in aluminum cans. These tracks are generally not suited for receiving bottled beverages such as bottled water. The bottles generally have a nonuniform cylindrical body with a neck extending from one end of the body and are not suited for rolling smoothly along a flat surface as are aluminum cans. The bottles tend to rotate as they travel down the track and get lodged within the track, thus preventing further bottles from being loaded into the machine and preventing bottles from being dispensed. Furthermore, if the bottles are allowed to accelerate freely down the tracks as they are loaded into the machine, the bottles will tend to rotate and not stay aligned with the track. This results in an increase in time required to load the vending machine due to maintenance personnel having to dislodge the jammed bottles and an increase in down time of the vending machine due to bottles being blocked from being dispensed.

Accordingly, among the several objects of this invention may be noted the provision of a vending machine for dispensing beverage containers such as bottles which effectively aligns the bottles along the length of a chute to prevent jamming of the chute as bottles are received in the chute or dispensed from the chute; the provision of a vending machine which slows down the bottles as they are fed into he machine to keep the bottles properly aligned within the chute; and the provision of a vending machine in which the above alignment features are inexpensive to manufacture and require minimal additional space within the vending machine.

Generally, a vending machine of this invention is for dispensing beverage containers having a cylindrical side wall forming a body and a neck extending from the cylindrical body. The body of the container includes a groove formed therein and extending around the circumference of the body. The vending machine includes at least one chute for storing and dispensing the containers. The chute includes a loading end located at an upper end thereof for receiving the containers and a delivery end at a lower end thereof for delivering the containers to a delivery area of the vending machine. The chute has at least two sequential paths. A first path extends generally at a downwardly sloped angled position from the loading end of the chute. A second path extends generally downwardly at an angled position from the first path so that the containers roll along the chute towards the delivery end of the chute. The chute includes a guide member along at least a portion of one of the paths for engaging the groove formed in the body of the container to align the bottles along at least a portion of the length of the chute.

In another aspect of the present invention, the vending machine includes a generally serpentine shaped chute for storing bottles and transferring the bottles along a path from a loading end of the chute located at an upper end thereof to a delivery end of the chute located at a lower end thereof. The chute includes at least one dampening member extending into the chute for slowing down and aligning the bottles as the bottles roll down the chute.

Other objects and features will be in part apparent and in part pointed out hereinafter.

BRIEF DESCRIPTION OF THE FIGURES

Corresponding parts are designated by corresponding reference numerals in the several views of the drawings.

DESCRIPTION OF THE PREFERRED EMBODIMENT

Figure 1:
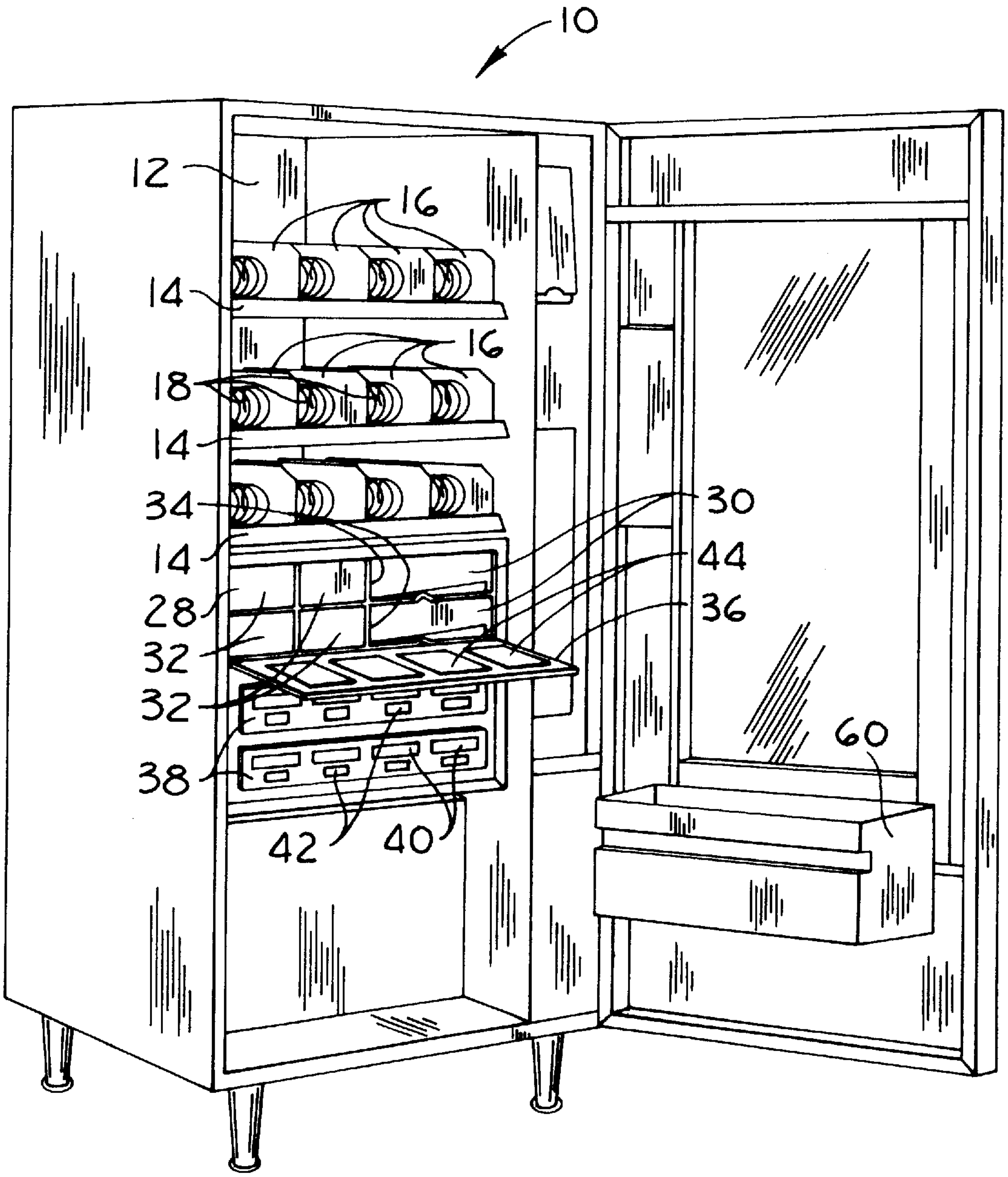
FIG. 1 is a perspective view of a vending machine of this invention shown with a door of the vending machine open and a beverage container loading door open.

Referring now to the drawings, and first to FIG. 1, there is generally indicated at 10 a vending machine of the present invention. The vending machine dispenses beverage containers and food. The vending machine is similar to the one described in U.S. Pat. No. 4,730,750 which is incorporated herein by reference. As shown in FIG. 1, the vending machine dispenses bottles, cans and candy or food packages. The food and candy are stored in an upper portion 12 of the vending machine having three shelves 14. Each of the shelves 14 has a separator 16 located between spiral arms 18 in which the food or candy packages are placed. The spiral arms 18 are rotated by motors (not shown) in response to a controller. It is to be understood that the vending machine 10 may dispense only beverage containers such as bottles 20, or bottles and cans, or may dispense both bottles and food or any combination thereof without departing from the scope of this invention. Furthermore, the number of shelves and rows of shelves and beverage storage areas along with the arrangement of the storage areas may vary without departing from the scope of this invention.

Figure 4:
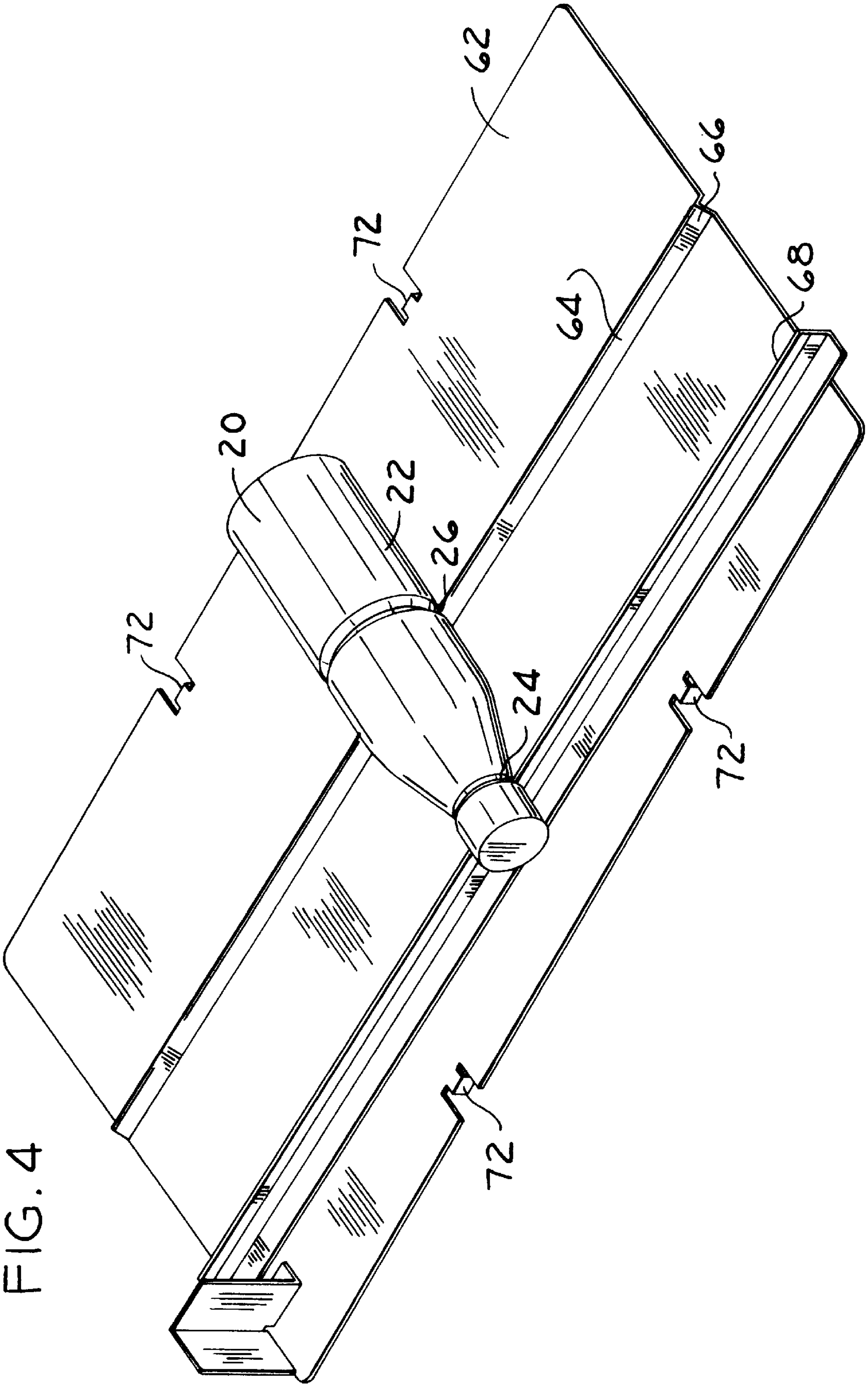
FIG. 4 is a perspective view of a track of a first path of a first chute of the beverage container module showing a bottle on the track.

An example of bottles 20 stored and dispensed from the vending machine are shown in FIG. 4. The bottle 20 includes a generally cylindrical side wall forming a body 22 and a neck 24 extending therefrom and having a diameter smaller than the diameter of the body. The bottle 20 includes a groove 26 formed in the body and extending around a circumference thereof. The bottle 20 may be formed from plastic, glass or any other suitable material and the location and size of the groove and size and shape of the bottle may vary without departing from the scope of this invention.

The vending machine 10 includes a beverage container module 28 for storing and dispensing beverage containers. As shown in FIG. 1, the module 28 has six dispensing areas, two for bottles and four for cans. Each of the dispensing areas include two side walls 34 for separating the individual container storage areas. A loading door 36 is located at the upper end of each storage area for loading the bottles 20 or cans into the storage area and a delivery door 38 is located at the lower end of the storage area for delivering the bottles or cans to a delivery area 60 of the vending machine 10. The delivery door 38 may include clear windows 40 for displaying the container to be next dispensed from one of the six delivery areas and labels 42 may be mounted below the corresponding window for displaying such things as price and item number for a corresponding switch on a selection panel. The loading door 36 may also have labels 44 affixed thereto to identify the beverages to be loaded into each storage area.

Figure 2:
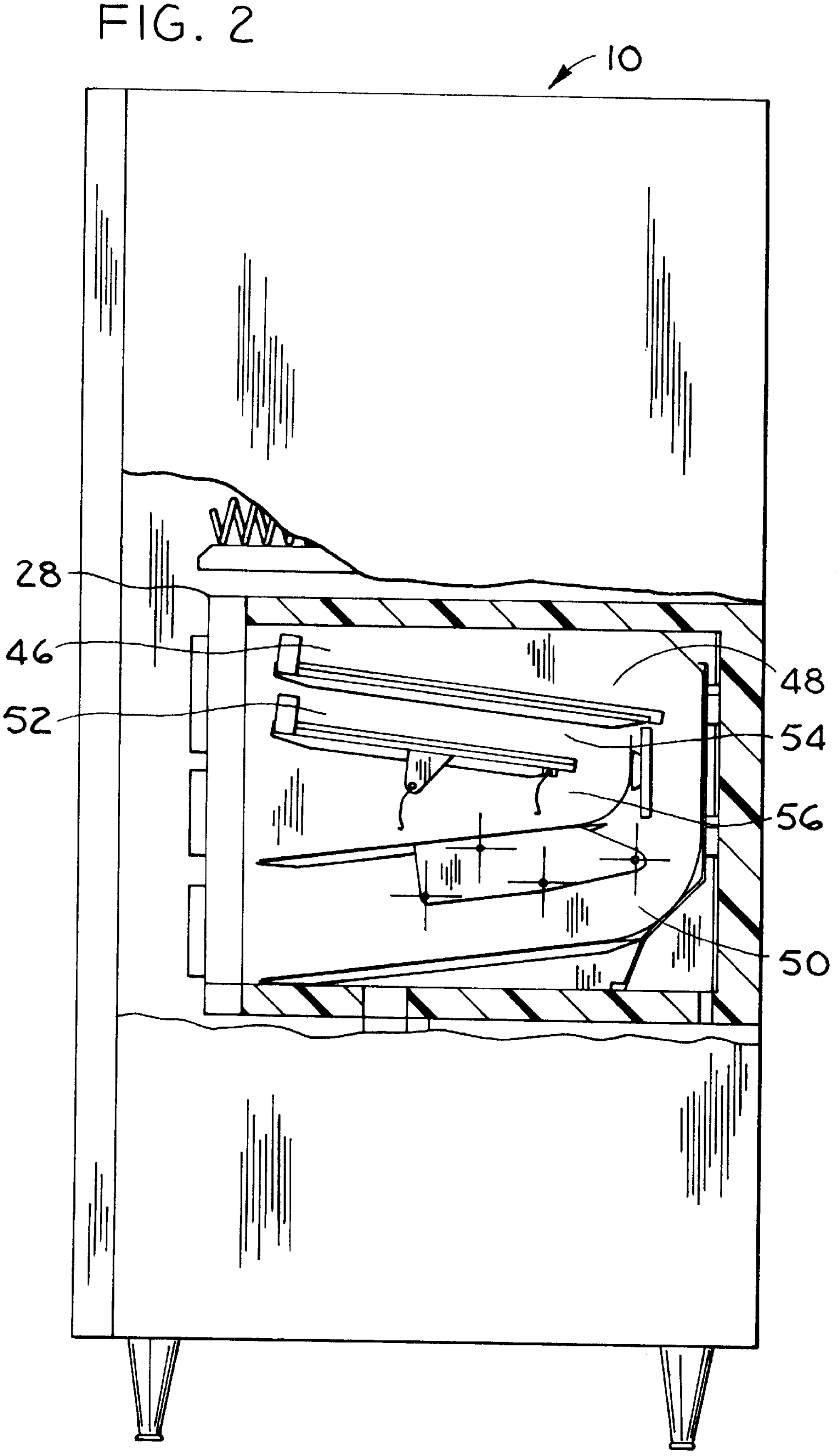
FIG. 2 is a side-view of the vending machine and a partial cross-sectional view of a beverage container module with parts broken away to show detail.
Figure 3:
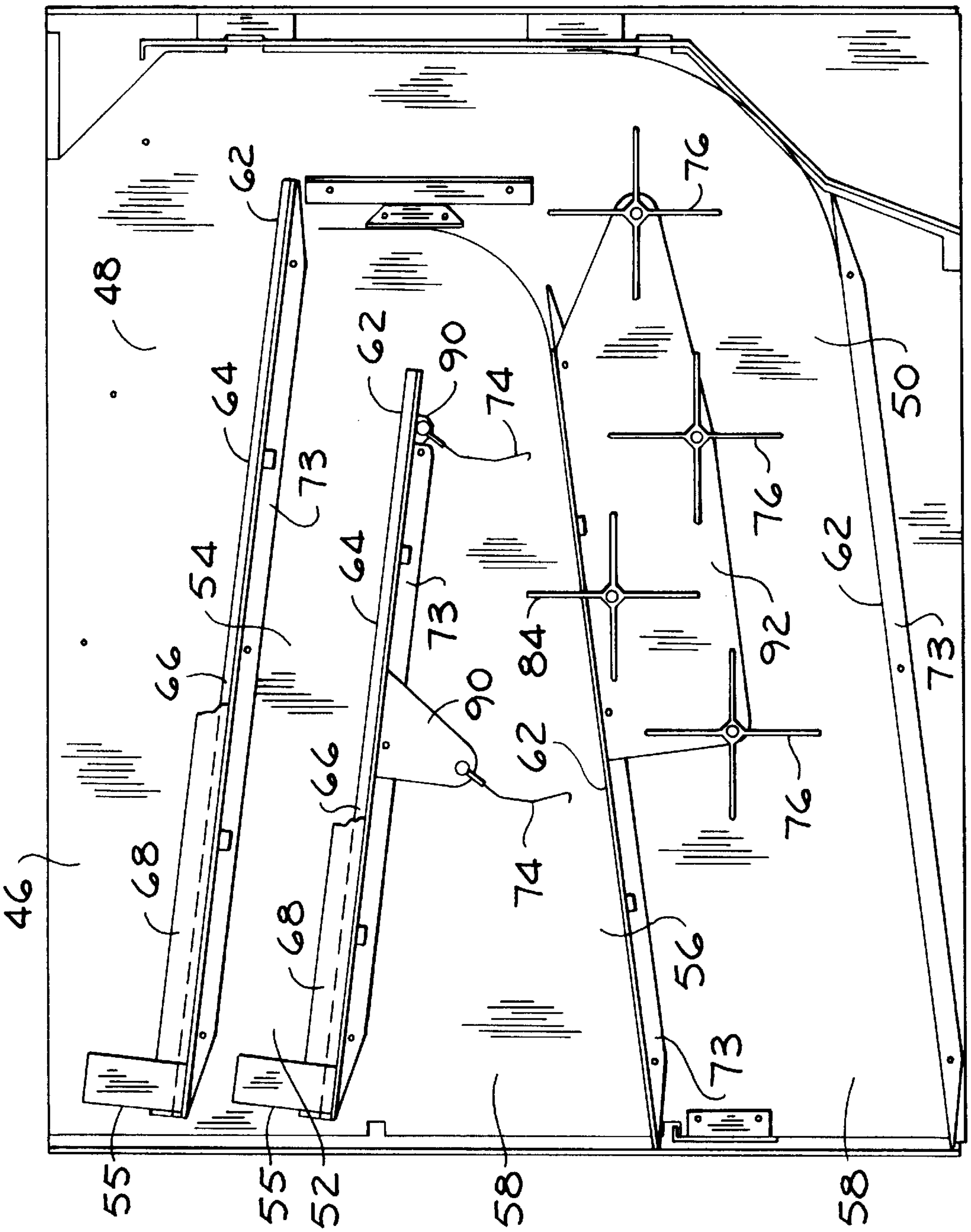
FIG. 3 is an enlarged side-view of the beverage container module with parts broken away to show detail.

The beverage container module 28 includes at least one generally serpentine shaped chute 46 (FIGS. 2 and 3) for storing and dispensing the bottles. The chute 46 has a loading end 55 located at an upper end thereof for receiving the bottles 20 and a delivery end 58 at a lower end thereof for delivering the bottles to a delivery area 60 of the vending machine 10. The chute 46 has at least two sequential paths 48, 50. The first path 48 extends generally at a downwardly sloped angled position from the loading end 55 of the chute 46. The second path 50 extends generally downwardly at an angled position from the first path 48 so that the bottles 20 roll along the chute 46 toward the delivery end 58 of the chute 46. The number of chutes may vary depending on the storage requirements and the capacity of the vending machine 10. As shown in FIGS. 2 and 3, the vending machine 10 includes two bottle chutes 46, 52 located adjacent one another such that the first path 54 of the second chute 52 is located below the first path 48 of the first chute 46 and the second path 56 of the second chute 52 is located above the second path 56 of the first chute 46. The chutes may also be located side by side as are the can chutes and the bottle chutes. The can chutes may be replaced with bottle chutes to increase the bottle storage capacity.

Each path of the bottle chutes includes a generally planar track 62 for supporting the bottles 20 and at least one path includes a guide member 64 located along at least a portion of one of the tracks for engaging the groove 26 formed in the body 22 of the bottle 20 to align the bottles along at least a portion of the length of the path (FIG. 4). The guide member 64 includes a v-shaped ridge 66 formed integrally with the track 62 and extending longitudinally along the entire length of the track. The ridge 66 may also be formed in other shapes or formed separately from the track and attached to the track or positioned adjacent to the track by suitable fastening means. The ridge 66 is sized to fit within the groove 26 formed in the body 22 of the bottle 20 while allowing the sidewalls of the body to roll freely along the surface of the track 62. The guide member 64 further includes a flange 68 mounted on the track 62 and extending generally parallel to the ridge 66 for supporting the neck 24 of the bottle 20. The track 62 is made from metal, plastic or any other suitable material and may be extruded with the ridge 66 formed in the track or the ridge may be bent into a flat piece of metal for example. The width and length of the track 62 may vary as well as the location of the ridge 66 and flange 68 for different size bottles and beverage container modules. The tracks 62 may also include a plurality of holes (not shown) to provide air flow for refrigeration within the container module 28. Tabs 72 are formed along each side of the tracks 62 for engaging with openings located in brackets 73 mounted on the side walls of each chute to hold the tracks in place.

The chutes 46, 52 further include at least one dampening member for slowing down the bottles 20 as they roll down the chutes and properly aligning the bottles on the tracks 62 as they are fed into the beverage container module 28. The dampening member contacts the bottle at at least two locations along the sidewall of the bottle 20 to straighten the bottle within the chute so that the bottle rolls along the chute generally perpendicular to the length of the path. The dampening member extends into the chute and is pivotally mounted so that it can rotate between an extended position in which the member is located in the path of the bottles and a retracted position in which the member is pivoted away from the path such that the bottles are free to travel past the member.

Figure 5:
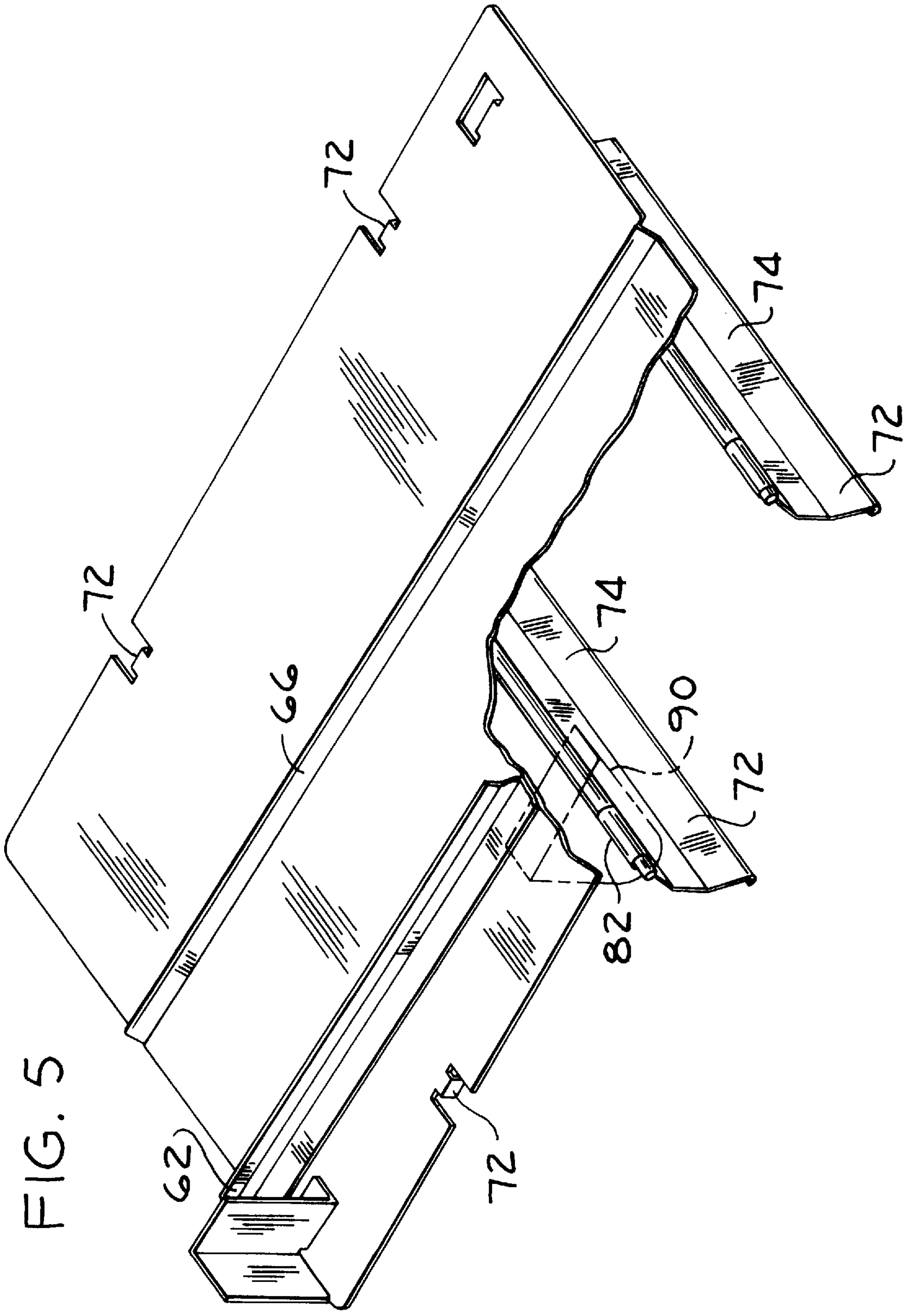
FIG. 5 is a perspective view of a track of a first path of a second chute of the beverage container module with parts broken away to show dampening members.
Figure 6:
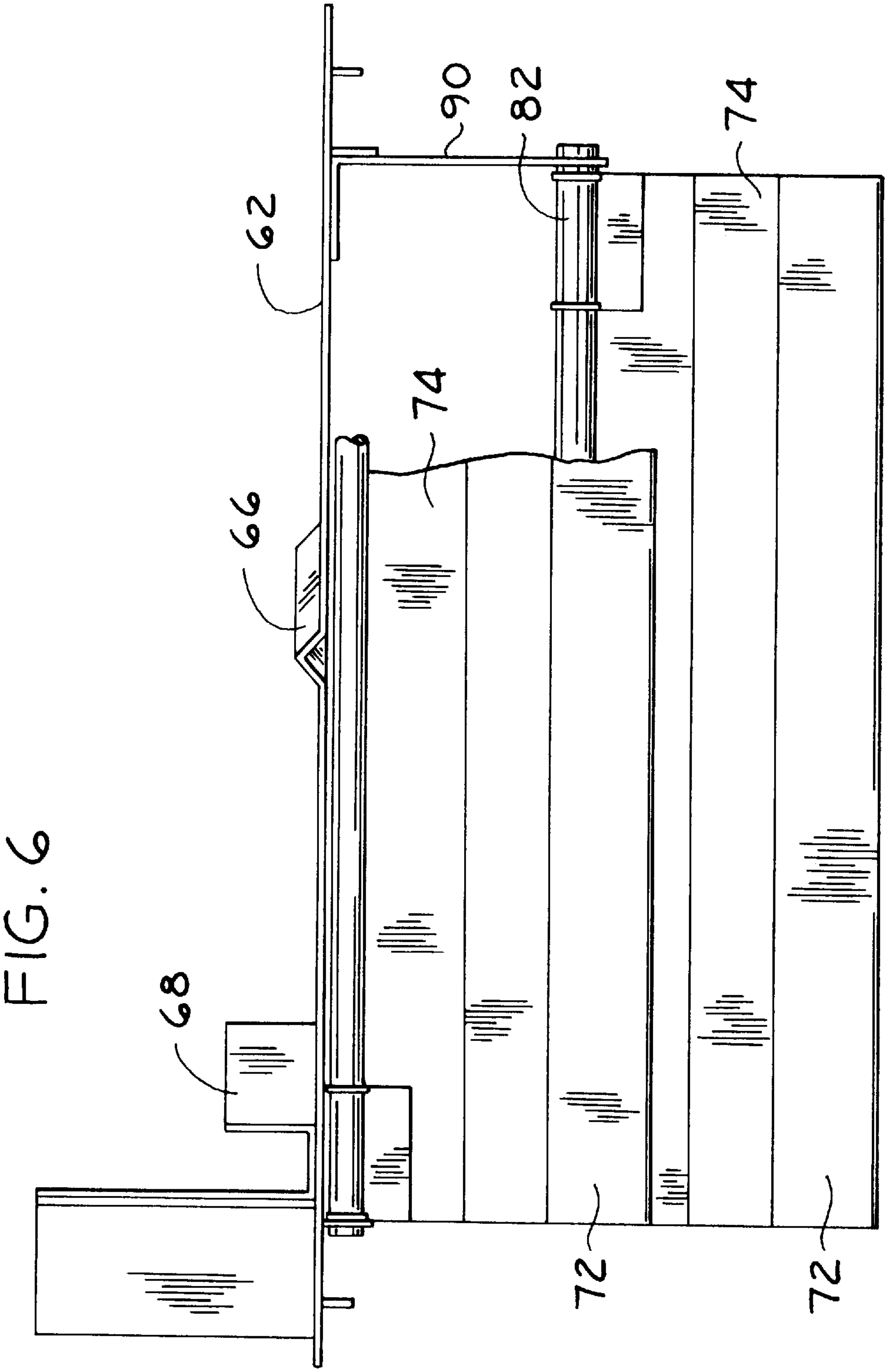
FIG. 6 is an end view of the track of FIG. 5 with parts broken away to show detail.

As shown in FIGS. 3 and 5, a first type 72 of dampening member comprises an arm 74 extending downwardly from the track 62 of the first path 54 of the second chute 52 to slow down and align the bottles 20 travelling along the second path 56 of the second chute 52. The arm 74 is slightly bent for receiving the bottles 20 as they roll down the path 56. The arms 74 are mounted on a pivot rod 82 attached to support brackets 90 which are mounted on a bottom surface of the track 62. As the bottles 20 roll down the track 62 the arms 74 are forced upward to the retraced position to allow the bottle to roll past the arm. The arms 74 are made from metal, plastic or other suitable materials and may also include holes to reduce the overall weight of the beverage container module 28.

Figure 7:
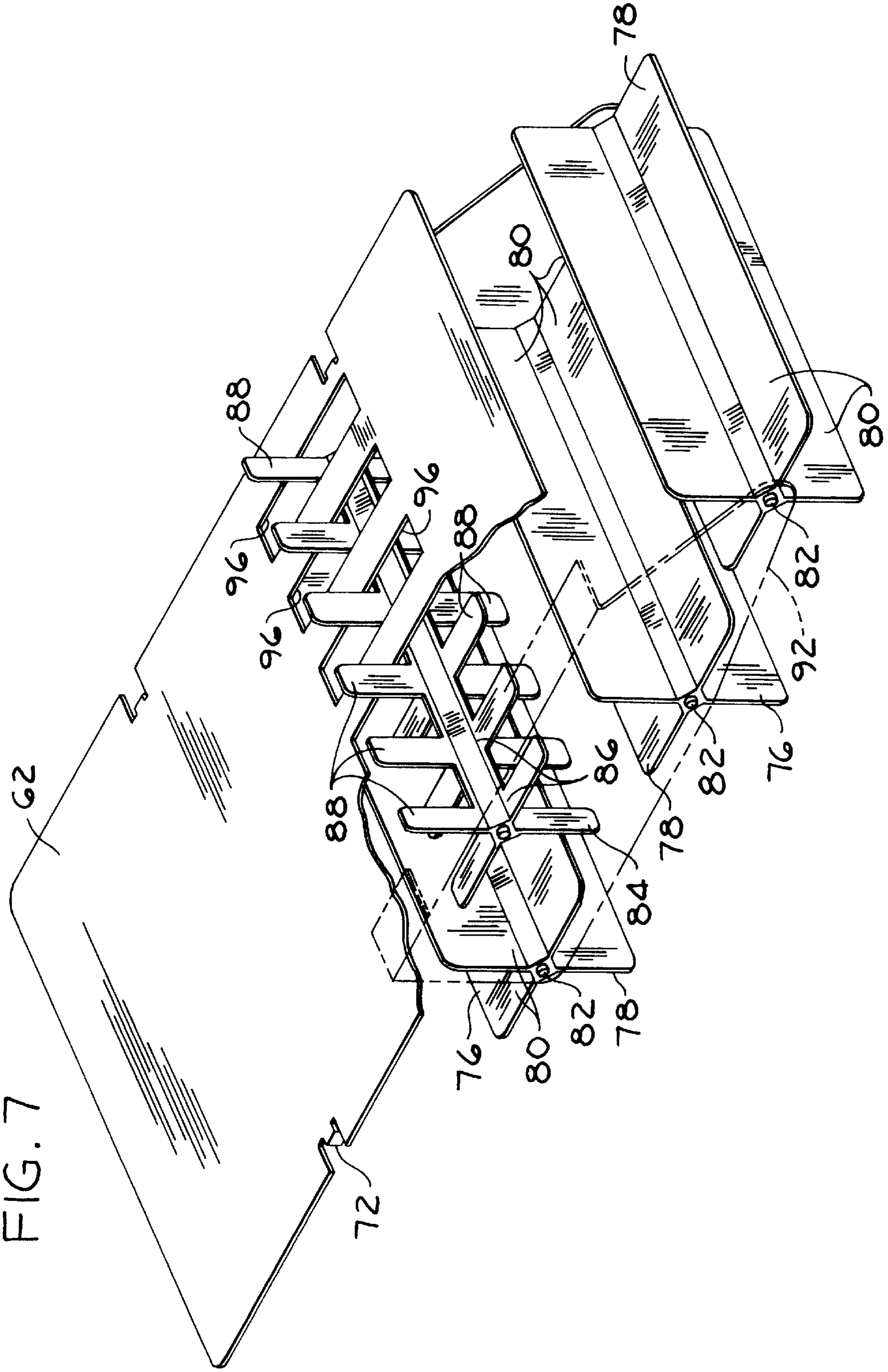
FIG. 7 is a perspective view of a track of a second path of the second chute with parts broken away to show dampening members.

A second type of dampening member 76 is shown in FIG. 7. Each dampening member 76 is in the shape of a paddle wheel 78. The paddle wheels 78 each include four evenly spaced paddles 80 extending into the second path 50 of the first chute 46 (FIG. 3). The paddles 80 are mounted on a central pivot rod 82 which is attached to two support brackets 92 extending from a lower surface of the track 62 of the second path 56 of the second chute 52. A third type of dampening member 84 is also shown in FIG. 7 and includes a plurality of paddle wheels 86 attached to a single pivot rod 82. The track 62 includes a plurality of slots 96 sized for receiving paddles 88 of the paddle wheels 86. The dampening member 84 is also mounted on the support brackets 92 extending downwardly from the track 62 of the second path 56 of the second chute 52. The slots 96 in the track 62 allow the paddle wheels 86 to slow and align bottles travelling along on the track 62 in the second path 56 of the second chute 52. The dampening members 76, 84 may be formed from metal, plastic or any other suitable material. The paddles 80, 88 may also include weighted members (not shown) such as a piece of metal attached to the paddle to increase the weight of the paddles to ensure that the paddles are in the extended position when the chute is empty. It is to be understood that the number, location and arrangement of the first, second or third type of dampening members may vary without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vending machine for dispensing beverage containers having a cylindrical side wall forming a body and a neck extending from the cylindrical body, the body having a groove formed therein and extending around the circumference thereof, the vending machine comprising at least one chute for storing and dispensing the containers, the chute having a loading end located at an upper end thereof for receiving the containers and a delivery end at a lower end thereof for delivering the containers to a delivery area of the vending machine, the chute having at least two sequential paths, a first path extending generally at a downwardly sloped angled position from the loading end of the chute, and a second path extending generally downwardly at an angled position from the first path so that the containers roll along the chute towards the delivery end of the chute, the chute having a guide member along at least a portion of one of the paths for engaging the groove formed in the body of the container to align the containers along at least a portion of the length of the path.

2. A vending machine as set forth in claim 1 further comprising a second chute located adjacent to the first chute for storing and dispensing containers, the second chute having a first path located below the first path of the first chute, and a second path located above the second path of the first chute, the second chute having a guide member along at least a portion of one of the paths of the second chute for engaging a groove formed in the body of each container to align the containers along at least a portion of the length of the path.

3. A vending machine as set forth in claim 2 wherein said guide member extends along the length of the first paths of the first chute and second chute.

4. A vending machine as set forth in claim 1 wherein each of said paths comprises a generally planar track for supporting the containers and wherein said guide member comprises a ridge extending upward from at least one of said tracks.

5. A vending machine as set forth in claim 4 wherein said ridge is generally V-shaped and formed integrally with the track and extends generally longitudinally along substantially the entire length of the track.

6. A vending machine as set forth in claim 4 wherein said guide member further comprises a flange extending generally parallel to the ridge for supporting the neck of the container and to further align the container along the length of the track.

7. A vending machine as set forth in claim 1 further comprising a plurality of dampening means extending into the chute for slowing down the containers as the containers roll down the chute.

8. A vending machine as set forth in claim 7 wherein said dampening means comprises at least one dampening member extending into the chute, the member being pivotally mounted so that it can rotate between an extended position in which the member is located in the path of the containers and a retracted position in which the member is pivoted away from the path such that the containers are free to travel past the member.

9. A beverage container module for storing beverage containers having a cylindrical side wall and a groove formed therein and extending around the circumference thereof, and for dispensing the beverage containers from within a housing of a vending machine, the module comprising at least one chute having a loading end located at an upper end thereof for receiving the containers and a delivery end at a lower end thereof for delivering the containers to a delivery area of the vending machine, the chute having at least two sequential paths, a first path extending generally at a downwardly sloped angled position from the loading end of the chute and a second path extending generally downwardly at an angled position from the first path so that the containers roll along the chute toward the delivery end of the chute, the chute having a guide member along at least a portion of one of the paths for engaging the groove formed in the container to align the containers along at least a portion of the length of the path.

10. A beverage container module as set forth in claim 9 further comprising a second chute located adjacent to the first chute for storing and dispensing containers, the second chute having a first path located below the first path of the first chute, and a second path located above the second path of the first chute, the second chute having a guide member along at least a portion of one of the paths of the second chute for engaging a groove formed in the body of the container to align the containers along at least a portion of the length of the path.

11. A beverage container module as set forth in claim 9 wherein each of said paths comprises a generally planar track for supporting the containers and wherein said guide member comprises a ridge extending upward from at least one of said tracks.

12. A beverage container module as set forth in claim 11 wherein said ridge is generally V-shaped and formed integrally with the track and extends generally longitudinally along substantially the entire length of the track and wherein said guide member further comprises a flange extending generally parallel to the ridge for supporting a neck of the container and to further align the container along the track.

13. A beverage container module as set forth in claim 9 further comprising a plurality of dampening means extending into the chute for slowing down the containers as the containers roll down the chute.

14. A beverage container module as set forth in claim 13 wherein said dampening means comprises at least one dampening member extending into the chute, the member being pivotally mounted so that it can rotate between an extended position in which the member is located in the path of the containers and a retracted position in which the member is pivoted away from the path such that the containers are free to travel past the member.

15. A vending machine for storing and dispensing beverage containers having a cylindrical sidewall forming a body and a neck extending therefrom, the vending machine comprising at least one chute for storing the containers and transferring the containers along a path from a loading end of the chute located at an upper end thereof to a delivery end of the chute located at a lower end thereof, the chute being formed in a generally serpentine shape and comprising dampening means extending into the chute for slowing down the containers as the containers roll down the chute as the containers are loaded into the chute and are dispensed from the chute; wherein the dampening means contacts the container at at least two locations along the sidewall of the container to straighten the container within the chute such that the containers roll along the chute generally perpendicular to the length of the path.

16. A vending machine as set forth in claim 15 wherein each of said paths comprises a generally planar track for supporting the containers and wherein said dampening means comprises at least one dampening member extending into the chute, the member being pivotally mounted so that it can rotate between an extended position in which the member is located in the path of the containers and a retracted position in which the member is pivoted away from the path such that the containers are free to travel past the member.

17. A vending machine as set forth in claim 16 wherein the dampening member is mounted to a support bracket extending from a lower surface of one of the tracks such that the member extends downward into the path located below the track.

18. A vending machine as set forth in claim 17 wherein the dampening member comprises a paddle wheel having four paddles extending from a central pivot rod, the wheel being rotated from its extended position with a first paddle located in the path to its retracted position and back to its extended position with a second paddle located in the path upon actuation by a container rolling into contact with the first paddle, the wheel rotating approximately 90 degrees as each container rolls past the wheel.

19. A vending machine as set forth in claim 16 wherein said dampening member comprises one arm extending generally transverse to the track and extending downwardly from the track so that the arm slows down and aligns the containers travelling in the path located below the track.

20. A vending machine as set forth in claim 16 wherein one of said track includes a plurality of slots formed therein and wherein said dampening member comprises a plurality of paddle wheels pivotally mounted on a pivot rod extending generally transverse to said track, each wheel having four paddles disposed below said track such that each paddle passes through one of the slots in said track upon rotation of the wheel for decelerating and aligning the containers as the containers roll along said track.

21. A vending machine as set forth in claim 20 further comprising three paddle wheels mounted on three pivot rods, each of the pivot rods being mounted on two support brackets extending from a bottom surface of the track to decelerate and align containers traveling in the path located below the track.

22. A vending machine as set forth in claim 15 further comprising a guide member located along at least a portion of one of the paths for engaging a groove located within a side wall of the container for aligning the containers along at least a portion of the path.

23. A beverage container module for storing and dispensing beverage containers from within a housing of a vending machine, the module comprising at least one chute for storing the containers and transferring the containers along a path from a loading end of the chute located at a lower end thereof for delivering the containers to a delivery area of the vending machine, the chute having at least two sequential paths, a first path extending generally downwardly at an angled position from the loading end of the chute and a second path extending generally downwardly at an angled Position from the first path so that the containers roll along the chute towards the delivery end of the chute, the chute comprising dampening means extending into the chute for slowing down the containers as the containers roll down the chute; wherein each of said paths comprises a generally planar track for supporting the containers and wherein said dampening means comprises at least one dampening member extending into the chute, the member being pivotally mounted so that it can rotate between an extended position in which the member is located in the path of the containers and a retracted position in which the member is pivoted away from the path such that the containers are free to travel past the member.

24. A beverage container module as set forth in claim 23 wherein the dampening member is mounted to a body extending from a lower portion of one of the tracks such that the member extends downward into the path located below the track.

25. A beverage container module as set forth in claim 24 wherein the dampening member comprises a paddle wheel having four paddles extending from a central pivot rod, the wheel being rotated from its extended position with a first paddle located in the path to its retracted position and back to its extended position with a second paddle located in the path upon actuation by a container rolling into contact with the first paddle, the wheel rotating approximately 90 degrees as each container rolls past the wheel.

26. A beverage container module as set forth in claim 23 wherein said dampening member comprises one arm extending generally transverse to the track and extending downwardly from the track so that the arm slows down and aligns the containers travelling in the path located below the track.

27. A beverage container module as set forth in claim 23 wherein one of said track includes a plurality of slots and wherein said dampening member comprises a plurality of paddle wheels pivotally mounted on a pivot rod extending generally transverse to said track, each wheel having four paddles disposed below said track such that each paddle passes through one of said slots upon rotation of the wheel for decelerating and aligning the containers as they roll along said track.

* * * * *